US006537354B2

(12) United States Patent
Meiller et al.

(10) Patent No.: US 6,537,354 B2
(45) Date of Patent: Mar. 25, 2003

(54) VALVE ASSEMBLY FOR VAPOR CANISTER

(75) Inventors: Thomas C. Meiller, Pittsford, NY (US); Gregory P. Weilnau, Churchville, NY (US); Charles H. Covert, Manchester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/918,597

(22) Filed: Jul. 31, 2001

(65) Prior Publication Data

US 2003/0024397 A1 Feb. 6, 2003

(51) Int. Cl.[7] .................................................. B01D 53/04

(52) U.S. Cl. ............................. 96/139; 96/152; 55/420; 123/519; 137/843

(58) Field of Search ......................... 123/519; 55/385.3, 55/417, 420, DIG. 19; 96/147, 152, 139; 137/843

(56) References Cited

U.S. PATENT DOCUMENTS 2,894,530 A * 7/1959 Stevens et al. .......... 137/493.7
4,192,751 A * 3/1980 Henton et al. .............. 210/136
4,894,072 A * 1/1990 Turner et al. ............... 123/519
5,286,282 A * 2/1994 Goodell et al. ............... 96/113
5,337,721 A * 8/1994 Kasuya et al. .............. 123/519
5,398,660 A * 3/1995 Koyama et al. ............ 123/519
5,632,251 A 5/1997 Ishikawa .................... 123/519
5,645,036 A * 7/1997 Matsumoto et al. ........ 123/516
5,718,209 A * 2/1998 Scardino et al. ............ 123/519
5,743,943 A 4/1998 Maeda et al. ................. 96/126

* cited by examiner

*Primary Examiner*—David A. Simmons
*Assistant Examiner*—Frank M. Lawrence
(74) *Attorney, Agent, or Firm*—Vincent A. Cichosz

(57) ABSTRACT

A valve assembly for a vapor canister includes a partition adapted to be disposed in an interior chamber of the vapor canister and having at least one opening extending therethrough. The valve assembly also includes a valve connected to the partition and covering the at least one opening and being movable to provide variable flow of fluid therethrough.

20 Claims, 4 Drawing Sheets

VALVE ASSEMBLY FOR VAPOR CANISTER

TECHNICAL FIELD

The present invention relates generally to vapor canisters for vehicles and, more particularly, to a valve assembly for a vapor canister of an evaporative emission system in a vehicle.

BACKGROUND OF THE INVENTION

It is known to provide a fuel tank in a vehicle to hold fuel to be used by an engine of the vehicle. It is also known to provide a vapor recovery and storage or evaporative emission system for the vehicle to reduce evaporative emissions of the fuel from the vehicle. Typically, the evaporate emission system includes a vapor canister remotely mounted such as in an engine compartment of the vehicle and operatively connected by separate external valves and lines to the fuel tank. However, the evaporative emission system is prone to permeation losses, has limited vapor storage capacity, and limited vapor flow rate acceptance.

New low emission vehicle requirements greatly reduce the amount of evaporative emissions allowed from the vehicle. The low levels now required effectively move the emissions from the "breakthrough" level—where the canister's carbon capacity was fully utilized—to the "bleed" level. These bleed emissions are hydrocarbon vapors that escape to atmosphere through migration of the canister's hydrocarbon heel. The vapor canister's bleed emission performance can be greatly improved with increased flow path length through the carbon bed. These features allow the carbon closest to the fresh airport to be very well purged and keep the migrating hydrocarbon vapors away from atmosphere. While increasing the flow length of the carbon bed is possible, the shape of the vapor canister is frequently constrained by vehicle packaging space. Additionally, a very efficient flow length to cross-sectional area ratio can increase flow restriction, resulting in a negative impact on on-board refueling vapor recovery (ORVR) performance.

Therefore, it is desirable to integrate a valve assembly into a vapor canister and reduce bleed emissions. It is also desirable to provide a valve assembly in a vapor canister that greatly reduces an opening for bleed performance, while allowing low restriction flow. It is further desirable to provide a valve assembly in a vapor canister that lowers cost, lowers evaporative emissions, and is easier to package in a vehicle.

SUMMARY OF THE INVENTION

It is, therefore, one object of the present invention to provide a valve assembly for a vapor canister in a vehicle.

It is another object of the present invention to provide a valve assembly for a vapor canister in a vehicle that reduces bleed emissions.

It is yet another object of the present invention to provide a valve assembly for a vapor canister in a vehicle that greatly reduces an opening for bleed performance while still allowing for low restriction flow.

To achieve the foregoing objects, the present invention is a valve assembly for a vapor canister including a partition adapted to be disposed in an interior chamber of the vapor canister and having at least one opening extending therethrough. The valve assembly also includes a valve connected to the partition and covering the at least one opening and being movable to provide variable flow of fluid therethrough.

One advantage of the present invention is that a valve assembly is provided for a vapor canister in a vehicle that reduces bleed emissions through partitioning of a carbon bed of the vapor canister. Another advantage of the present invention is that the valve assembly incorporates a variable flow opening into a horizontal partition or at the atmosphere port of a vapor canister, thereby lowering costs. Yet another advantage of the present invention is that the valve assembly has a variable opening that allows for low flow restriction for ORVR and purge, but limits the opening during low flow situation, greatly improving low emission vehicle performance. Still another advantage of the present invention is that the valve assembly is relatively simple and inexpensive. A further advantage of the present invention is that the valve assembly does not attempt to seal the opening, just reduce the size of the opening during low flow conditions, eliminating the need for additional components such as springs, etc. Yet a further advantage of the present invention is that the valve assembly greatly reduces the opening for bleed performance, while still allowing for low restriction flow.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
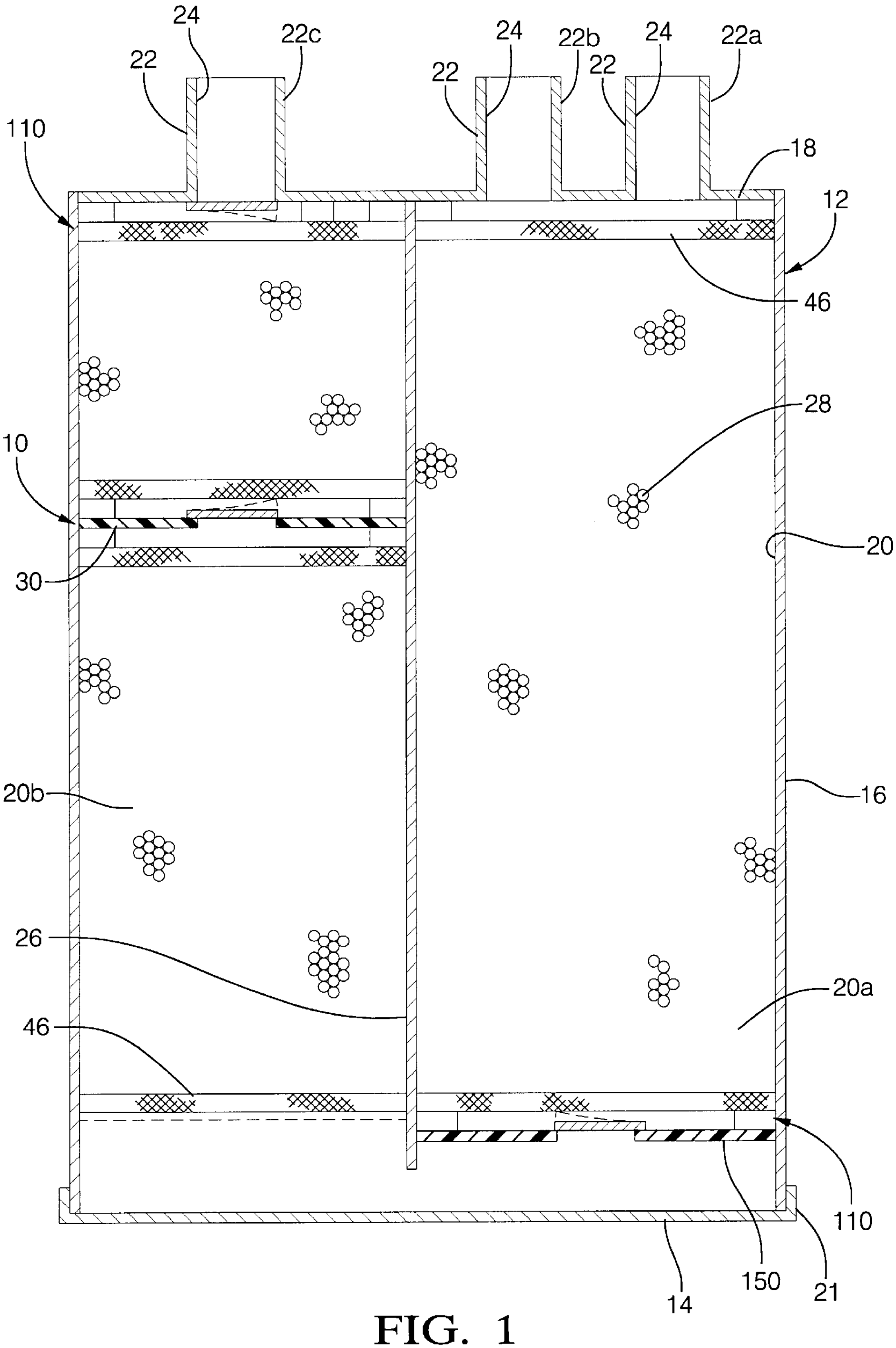
FIG. 1 is a fragmentary elevational view of a valve assembly, according to the present invention, illustrated in operational relationship with a vapor canister.
Figure 2:
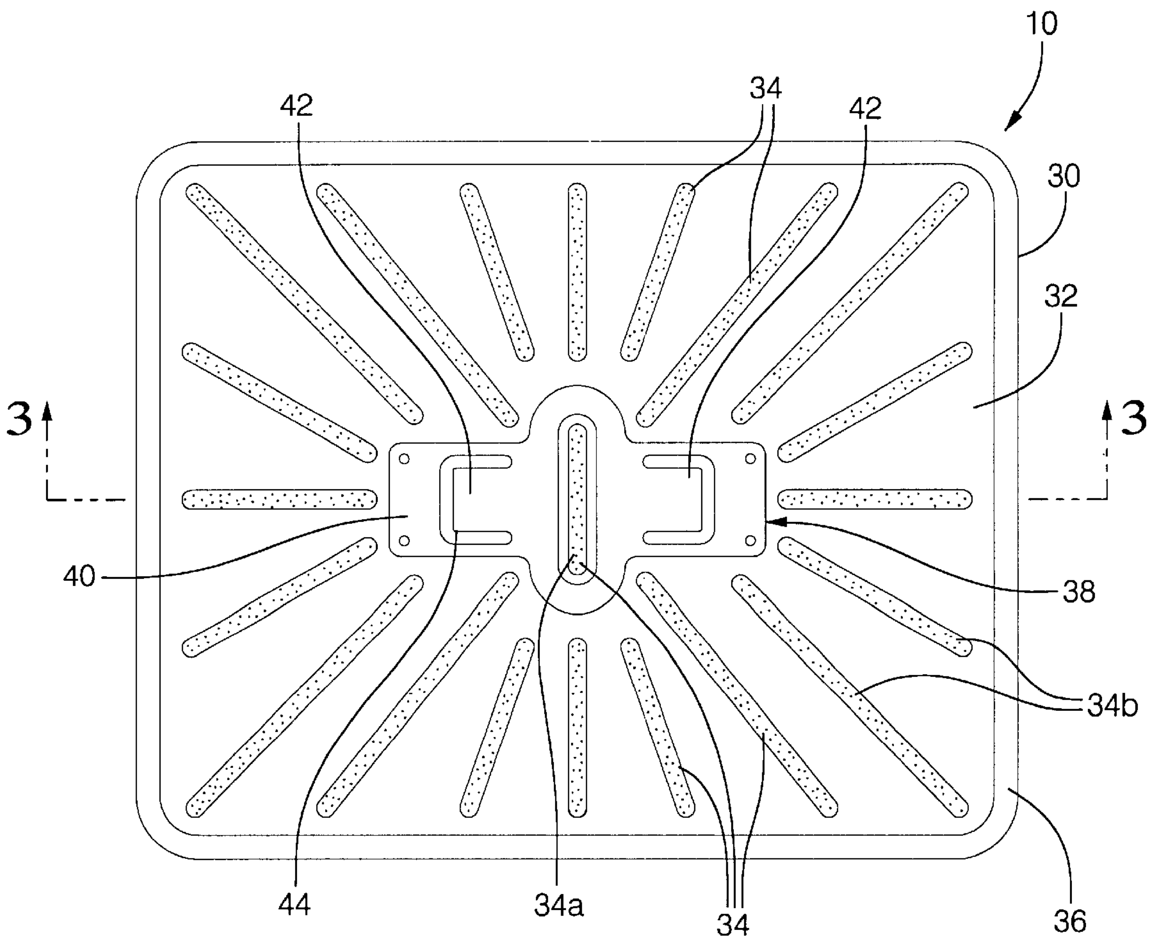
FIG. 2 is a plan view of the valve assembly of FIG. 1.
Figure 3:
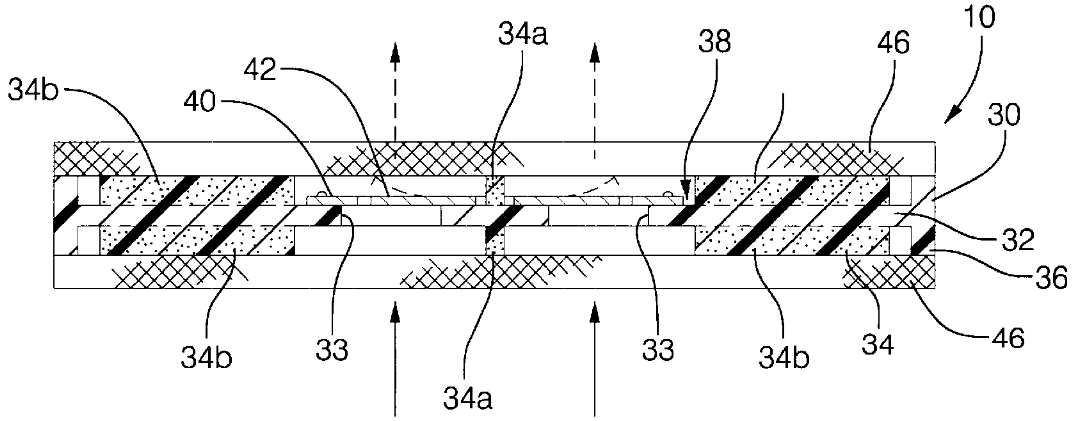
FIG. 3 is a sectional view taken along line 3—3 of FIG. 2.

Referring to the drawings and in particular FIGS. 1 through 3, one embodiment of a valve assembly 10, according to the present invention, is shown for a vapor canister, generally indicated at 12, of an evaporative emission system (not shown) in a vehicle (not shown). The vapor canister 12 is used to store or hold fuel vapor. In this embodiment, the vapor canister 12 is generally rectangular in shape and has a generally rectangular cross-sectional shape. The vapor canister 12 includes a base or bottom wall 14 and a side wall 16 around a periphery of the bottom wall 14 and extending generally perpendicular thereto. The vapor canister 12 also includes a top wall 18 extending generally perpendicular to the side wall 16 to form an interior chamber 20. The bottom wall 14 may have a flange 21 extending perpendicularly thereto and overlapping a portion of the side wall 16. The vapor canister 12 further includes at least one, preferably a plurality of connectors or tubes 22 extending axially outwardly and generally perpendicular to the top wall 18. The tubes 22 form a first tube **22*a* for connection to a purge line (not shown), a second tube 22***b* for connection to a fuel tank (not shown), and a third tube 22*c* for connection to or being open to atmosphere. Each of the tubes 22*a*, 22*b*, 22*c* have a passageway 24 communicating with the interior chamber 20. The vapor canister 12 has an interior wall 26 extending axially between the top wall 18 and bottom wall 14 to divide the interior chamber 20 into a first chamber 20*a* and a second chamber 20*b* for a function to be described. The vapor canister 12 includes a bed 28 of a vapor absorbing material such as activated carbon material for adsorbing fuel vapor. The vapor canister 12 is made of a rigid material, preferably a plastic material. It should be appreciated that the vapor canister 12 could be made of a metal material such as steel.

In one embodiment, the valve assembly 10 is disposed in the carbon bed 28 of the second chamber 20*b* to effectively break one long chamber and divide the second chamber 20*b* into two shorter chambers. The valve assembly 10 includes a partition 30 having a generally rectangular shape. The partition 30 has a base wall 32 being generally planar with at least one opening 33 extending axially therethrough to allow flow across the partition 30. In the embodiment illustrated in FIG. 3, the partition 30 has a pair of openings 33 spaced radially and extending axially through the base wall 32. The partition 30 also includes at least one, preferably a plurality of ribs 34 extending outwardly on both sides of the base wall 32. The ribs 34 include a central primary rib 34*a* and secondary ribs 34*b* extending radially outwardly and spaced radially and circumferentially about the primary rib 34*a*. The partition 30 also has a side wall 36 surrounding a periphery of the base wall 32 and extending generally perpendicular thereto. The partition 30 is made of a rigid material such as plastic. The partition 30 is a monolithic structure being integral, unitary, and one piece. It should be appreciated that the partition 30 is orientated horizontally and rests upon the carbon material in the carbon bed 28 and extends radially across the second chamber 20*b*.

The valve assembly 10 also includes a valve 38 incorporated on the partition 30 to cover the opening 33. The valve 38 has a support portion 40 extending across each opening 33 and a flapper portion 42 connected to the support portion 40. The valve 38 has a space or clearance 44 around three sides between the flapper portion 42 and the support portion 40. The flapper portion 42 is generally rectangular in shape and has one end connected to the support portion 40. The flapper portion 42 is movable in both directions relative to the support portion 40 to vary the size of the space 44. The valve 38 is made of a flexible material such as Mylar. The valve 38 is a simple die cut thin sheet of material. The support portion 40 of the valve 38 is connected to the partition 30 by suitable means such as an adhesive, snaps, or stakes. The valve 38 is a monolithic structure being integral, unitary, and one-piece. It should be appreciated that multiple flapper portions 42 can be incorporated into the valve 38 to reduce the cross-section of the flapper portion 42, which may be a concern relative to a screen 46 to be described above the valve 38 being able to support the carbon bed 28 without deflecting into the travel region of the flapper portion 42. It should also be appreciated that the valve 38 is opened to allow flow for purging the vapor canister 12 and refueling the vehicle (ORVR flow).

The valve assembly 10 further includes at least one, preferably a pair of screens 46 connected to the partition 30. One screen 46 is disposed on each side of the partition 30 to ensure free travel in both flow directions for the flapper portion 42 of the valve 38. The screen 46 is generally rectangular in shape and connected to the side wall 36 by suitable means such as an adhesive. The screen 46 is made of a rigid material, preferably a plastic material such as foam. The screen 46 is a monolithic structure being integral, unitary, and one-piece. It should be appreciated that the total deflection of the flapper portion 42 is limited by the screens 46, which support the carbon bed 28. It should also be appreciated that additional screens 46 may be placed at other locations in the vapor canister 12.

In operation, fuel vapors enter the vapor canister 12 through the tube 22*b* and are adsorbed by the vapor adsorbing material in the canister bed 28. Filtered air enters the vapor canister 12 through the tube 22*c* to flush the canister bed 28. In low flow conditions, such as diurnal loading and back purging of the vapor canister 12, the flapper portion 42 of the valve 38 remains in a neutral or closed position as illustrated by the solid lines in FIGS. 1 through 3. The space 44 around the flapper portion 42 of the valve 38, assures that low flow can occur without increasing pressure in the fuel tank (not shown) or reducing back-purge flow volume. During purge and refueling, the flapper portion 42 of the valve 38 freely deflects, thereby opening the size of the space 44. It should be appreciated that the flapper portion 42 defects in the direction of flow as indicated by the arrows and the phantom lines in FIGS. 1 and 3. It should also be appreciated that the flapper portion 42 deflects in opposite directions for purge and ORVR. It should further be appreciated that the purging of vapor fuel is conventional and known in the art.

Figure 4:
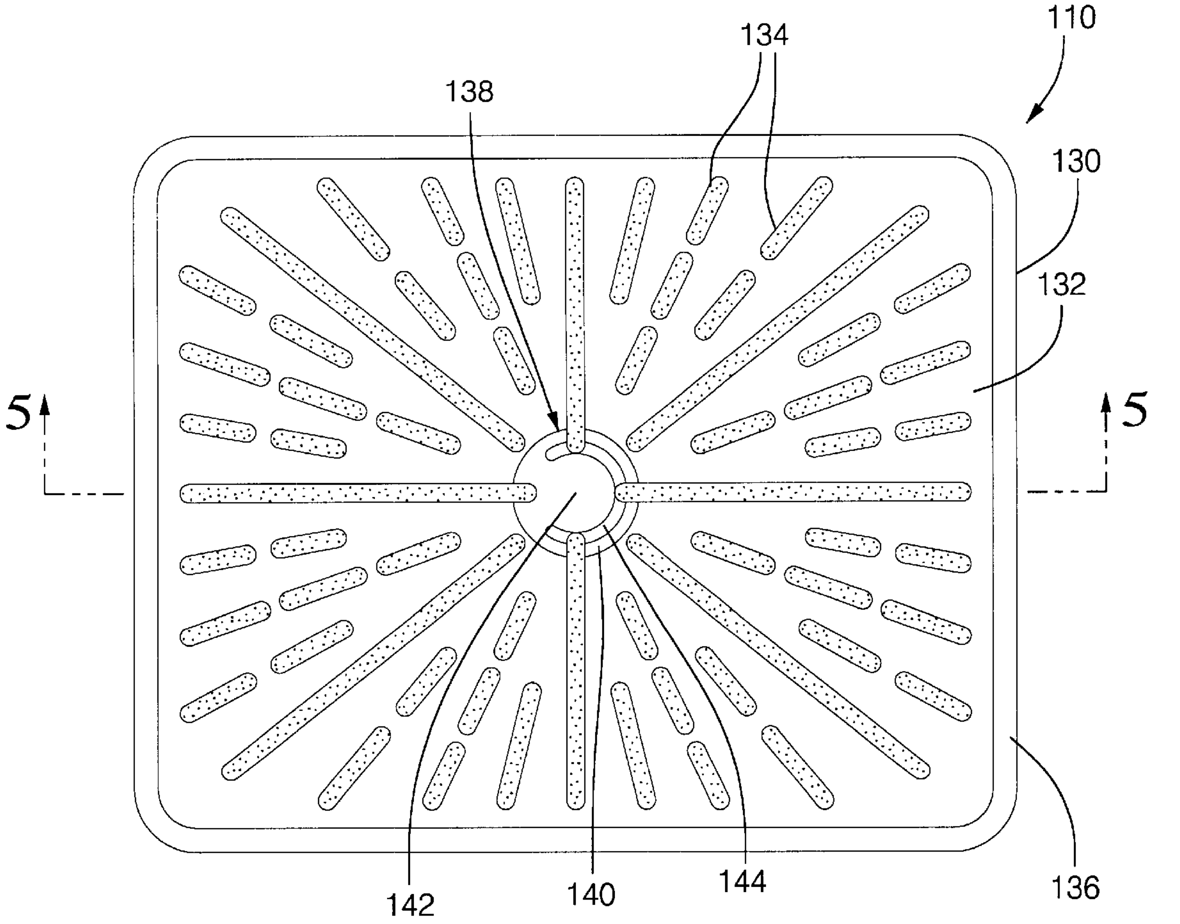
FIG. 4 is a plan view of another embodiment, according to the present invention, of the valve assembly of FIG. 1.
Figure 5:
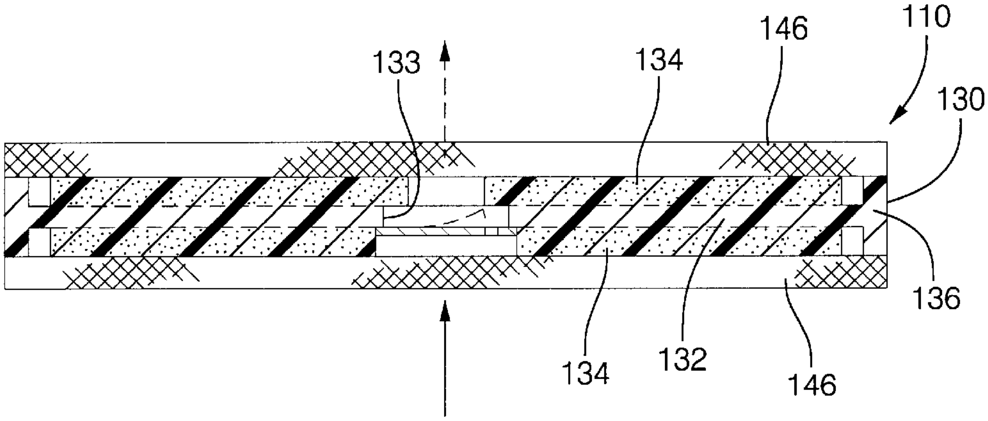
FIG. 5 is a sectional view taken along line 5—5 of FIG. 4.

Referring to FIGS. 4 and 5, another embodiment, according to the present invention, of the valve assembly 10 is shown. Like parts of the valve assembly 10 have like reference numerals increased by one hundred (100). In this embodiment, the valve assembly 110 includes the partition 130 having a single opening 133. The valve 138 extends across the opening 133 and has the support portion 140 and a single flapper portion 142. The support portion 140 and flapper portion 42 are generally circular in shape. The operation of the valve assembly 110 is similar to the valve assembly 10. It should be appreciated that the valve assembly 110 may be incorporated at other areas in the vapor canister 12 such as at the fresh air port to reduce the open area out of vapor canister 12 during low flow situations or incorporated in a volume compensator plate 150 to meet durability requirements as illustrated in FIG. 1.

Figure 6:
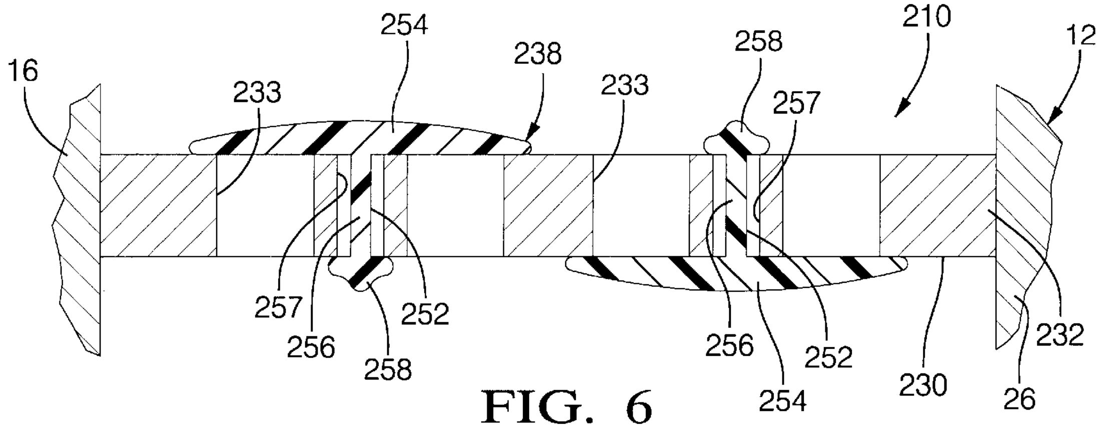
FIG. 6 is a fragmentary elevational view of yet another embodiment, according to the present invention, of the valve assembly of FIG. 1.
Figure 7:
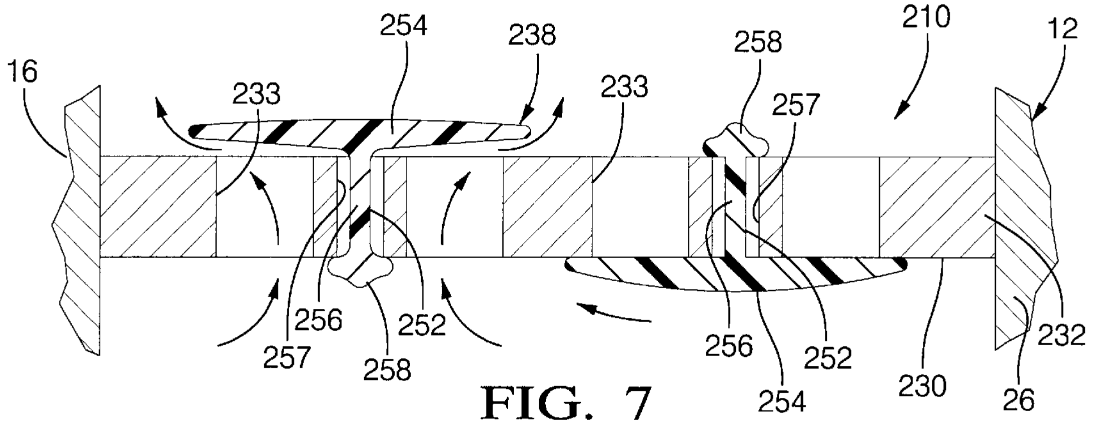
FIG. 7 is a view similar to FIG. 6 of the valve assembly illustrating a first operational state.
Figure 8:
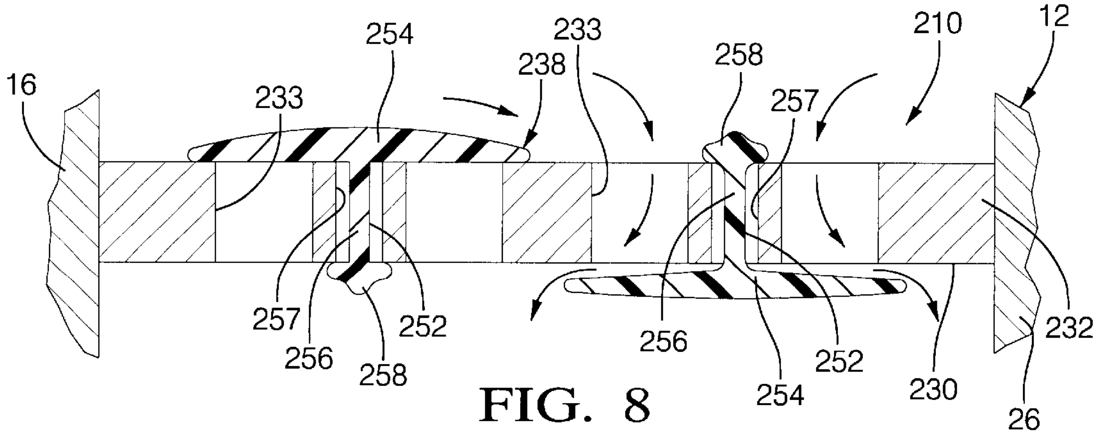
FIG. 8 is a view similar to FIG. 6 of the valve assembly illustrating a second operational state.

Referring to FIGS. 6 through 8, yet another embodiment, according to the present invention, of the valve assembly 10 is shown. Like parts of the valve assembly 10 have like reference numerals increased by two hundred (200). In this embodiment, the valve assembly 210 includes the partition 230 having a pair of openings 233 extending through the base wall 232. The valve assembly 210 also includes the valve 38 having a single direction or one-way valve member 252 for each opening 233. The valve member 252 is of an umbrella type. The valve member 252 is disposed over one end of the opening 233 and movable relative thereto. The valve member 252 has a head 254 to open and close the opening 233 and a shaft 256 extending axially from the head 254 and through an opening 257 in the partition 230 and a flange 258 at one end of the shaft 256 to prevent the shaft 256 from exiting the opening 257. The head 254 has a generally circular umbrella shape, the shaft 256 has a generally cylindrical shape, and the flange 258 has a generally triangular shape. The valve member 252 is made of a flexible material such as an elastomeric or plastic material. The head 254 of one valve member 252 is disposed on one side of the partition 230 and the head 254 of the other valve member 252 is disposed on the other side of the partition 230. It should be appreciated that the valve assembly 210 includes the screens (not shown) above and below the partition 230. It should also be appreciated that other types of valve members could be used for the umbrella type valve members such as ball and seat check valve members.

As illustrated in FIG. 7, flow from the bottom of the partition 230 is through one of the openings 233 and valve members 252. When this occurs, the flow deflects the head 254 of the valve member 252 to flow therepast as illustrated by the arrows. As illustrated in FIG. 8, flow from the top of the partition 230 is through the other one of the openings 233 and valve members 252. When this occurs, the flow deflects the head 254 of the valve member 252 to flow therepast as illustrated by the arrows. It should be appreciated that operation of the valve assembly 210 is similar to the valve assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valve assembly for a vapor canister comprising:

a partition adapted to be disposed in an interior chamber of the vapor canister to contact a bed of vapor adsorbing material disposed in the interior chamber of the vapor canister, said partition having at least one opening extending therethrough;

a valve connected to said partition and covering said at least one opening and being movable to provide variable flow of fluid therethrough; and at least one screen to prevent the vapor adsorbing material from entering said valve.

2. A valve assembly as set forth in claim 1 wherein said valve has a support portion connected to said partition and a flapper portion connected to said support portion and being movable relative thereto.

3. A valve assembly as set forth in claim 2 wherein said flapper portion is generally rectangular in shape.

4. A valve assembly as set forth in claim 2 wherein said flapper portion is generally circular in shape.

5. A valve assembly as set forth in claim 2 wherein said valve has a support portion connected to said partition and a plurality of flapper portions connected to said support portion and being movable relative thereto.

6. A valve assembly as set forth in claim 1 wherein said valve is of a single direction type.

7. A valve assembly as set forth in claim 1 wherein said valve comprises at least one valve member connected to said partition and having a head being movable relative thereto.

8. A valve assembly as set forth in claim 1 wherein said partition has a base wall and a plurality of ribs extending outwardly on at least one side of said base wall.

9. A valve assembly for a vapor canister comprising:

a partition adapted to be disposed in an interior chamber of the vapor canister and having at least one opening extending therethrough;

a valve connected to said partition and covering said at least one opening and being movable to provide variable flow of fluid therethrough;

wherein said partition has a base wall and a plurality of ribs extending outwardly on at least one side of said base wall; and wherein said ribs extend radially and are spaced circumferentially about said at least one opening.

10. A valve assembly for a vapor canister comprising:

a partition adapted to be disposed in an interior chamber of the vapor canister and having at least one opening extending therethrough;

a valve connected to said partition and covering said at least one opening and being movable to provide variable flow of fluid therethrough;

wherein said valve has a support portion connected to said partition and a flapper portion connected to said support portion and being movable relative thereto; and wherein said valve has a space between at least one end of said flapper portion and said support portion.

11. A valve assembly for a vapor canister comprising:

a partition adapted to be disposed in an interior chamber of the vapor canister and having at least one opening extending therethrough;

a valve connected to said partition and covering said at least one opening and being movable to provide variable flow of fluid therethrough; and at least one screen connected to said partition and spaced axially from said valve.

12. A vapor canister assembly for a vehicle comprising:

a vapor canister having a top wall, bottom wall, and side wall forming an interior chamber, an interior wall extending axially between said top wall and said bottom wall to divide said interior chamber into a first chamber and a second chamber, and a bed of vapor adsorbing material disposed in said interior chamber;

a partition disposed in either one of said first chamber and said second chamber of said interior chamber of said vapor canister and contacting said bed, said partition having at least one opening extending therethrough; and a valve connected to said partition and covering said at least one opening and being movable to provide variable flow of fluid therethrough.

13. A vapor canister assembly as set forth in claim 12 wherein said valve has a support portion connected to said partition and a flapper portion connected to said support portion and being movable relative thereto.

14. A vapor canister assembly as set forth in claim 12 wherein said valve is of a single direction type.

15. A vapor canister assembly as set forth in claim 12 wherein said valve comprises at least one valve member connected to said partition and having a head being movable relative thereto.

16. A vapor canister assembly as set forth in claim 12 wherein said partition has a base wall and a plurality of ribs extending outwardly on at least one side of said base wall.

17. A vapor canister assembly for a vehicle comprising:

a vapor canister having an interior chamber and a bed of vapor adsorbing material disposed in said interior chamber;

a partition disposed in said interior chamber of said vapor canister and having at least one opening extending therethrough;

a valve connected to said partition and covering said at least one opening and being movable to provide variable flow of fluid therethrough;

wherein said valve has a support portion connected to said partition and a flapper portion connected to said support portion and being movable relative thereto; and wherein said valve has a space between at least one end of said flapper portion and said support portion.

18. A vapor canister assembly for a vehicle comprising:

a vapor canister having an interior chamber and a bed of vapor adsorbing material disposed in said interior chamber;

a partition disposed in said interior chamber of said vapor canister and having at least one opening extending therethrough;

a valve connected to said partition and covering said at least one opening and being movable to provide variable flow of fluid therethrough;

wherein said partition has a base wall and a plurality of ribs extending outwardly on at least one side of said base wall; and wherein said ribs extend radially and are spaced circumferentially about said at least one opening.

19. A vapor canister assembly for a vehicle comprising:

a vapor canister having an interior chamber and a bed of vapor adsorbing material disposed in said interior chamber;

a partition disposed in said interior chamber of said vapor canister and having at least one opening extending therethrough;

a valve connected to said partition and covering said at least one opening and being movable to provide variable flow of fluid therethrough; and at least one screen connected to said partition and spaced axially from said valve.

20. A vapor canister assembly for a vehicle comprising:

a vapor canister having an interior chamber and a bed of vapor adsorbing material disposed in said interior chamber;

a partition disposed in said interior chamber of said vapor canister and having a base wall, at least one opening extending through said base wall, and a plurality of ribs extending outwardly on at least one side of said base wall and spaced about said at least one opening;

a valve connected to said partition and covering said at least one opening and being movable to provide variable flow of fluid therethrough; and at least one screen connected to said partition and spaced axially from said valve.

* * * * *